(12) United States Patent
Husted et al.

(10) Patent No.: US 8,295,404 B1
(45) Date of Patent: Oct. 23, 2012

(54) TIMING TRACKER FOR DPSK RECEIVER

(75) Inventors: Paul J. Husted, San Jose, CA (US); Soner Ozgur, Santa Clara, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 1056 days.

(21) Appl. No.: 12/122,013

(22) Filed: May 16, 2008

(51) Int. Cl.
  *H03D 3/22* (2006.01)
(52) U.S. Cl. ........................................ 375/329; 375/350
(58) Field of Classification Search .................. 375/130, 375/316, 329, 350, 359; 455/67.11, 114.3, 455/422.1
See application file for complete search history.

(56) References Cited

U.S. PATENT DOCUMENTS

| | | | |
|---|---|---|---|
| 5,089,822 A * | 2/1992 | Abaunza et al. | 342/30 |
| 7,133,458 B2 * | 11/2006 | Sakoda | 375/260 |
| 2001/0017902 A1 * | 8/2001 | Yamagata et al. | 375/329 |
| 2003/0012313 A1 * | 1/2003 | Husted et al. | 375/345 |
| 2005/0009476 A1 * | 1/2005 | Wu et al. | 455/101 |
| 2005/0111530 A1 * | 5/2005 | Chen et al. | 375/150 |
| 2005/0243952 A1 * | 11/2005 | Li | 375/343 |
| 2006/0061691 A1 * | 3/2006 | Rabinowitz et al. | 348/625 |
| 2006/0176989 A1 * | 8/2006 | Jensen | 375/350 |
| 2006/0270355 A1 * | 11/2006 | Mak et al. | 455/67.11 |
| 2008/0079485 A1 * | 4/2008 | Taipale et al. | 329/347 |
| 2008/0273621 A1 * | 11/2008 | Manakkal et al. | 375/267 |
| 2009/0015714 A1 * | 1/2009 | Hendrix et al. | 348/484 |

* cited by examiner

*Primary Examiner* — Leon-Viet Nguyen
(74) *Attorney, Agent, or Firm* — Bever, Hoffman & Harms, LLP

(57) ABSTRACT

One embodiment of a DPSK receiver includes an ADC, a down-sampler, and a timing tracker. The ADC samples a received DPSK signal providing sub-samples of a digital signal. The timing tracker examines differences between amplitudes of currently selected sub-samples and sub-samples before and after the currently selected sub-samples. The differences may indicate a timing adjustment may be made to the digital signal. The timing tracker may change the timing of the digital signal by modifying the configuration of the down-sampler. Additionally, the timing tracker may also correct phase errors introduced by configuration changes of the down-sampler.

18 Claims, 4 Drawing Sheets

TIMING TRACKER FOR DPSK RECEIVER

BACKGROUND OF THE INVENTION

1. Field of the Invention

Embodiments of the specification generally relate to wireless communications, and more specifically to tracking timing changes with a differential phase shift keying (DPSK) wireless receiver.

2. Description of the Related Art

Differential phase shift keying (DPSK) modulation is often used for wireless applications where a simple modulation scheme is sufficient to support the amount of data to be carried. For example, the extended data rates (EDR) of Bluetooth version 2.0 and 2.1 as specified by the Bluetooth Special Interest Group (SIG) use 4 DPSK and 8 DPSK modulation schemes to support 2 Mbs and 3 Mbs of data throughput respectively. DPSK modulation is relatively easy to implement in both wireless transmitters and receivers.

As is well-known, with DPSK modulation, data is encoded with phase shifts between DPSK constellation points. The wireless transmitter transmits constellation points to the wireless receiver. The constellation points are typically sent periodically. For example, a constellation point transmission rate that supports the 3 Mbs Bluetooth EDR data rate may be 1 MHz (i.e., 1 us period). The wireless receiver determines phase differences between transmitted constellation points, and thereby determines the related transmitted data.

FIG. 1 is a diagram of an 8 DPSK system including eight constellation points 101, 103, 105, 107, 109, 111, 113, and 115. Data is encoded by phase changes between constellation points. For example, the phase change associated with going from point 101 to point 111 may be associated with a particular symbol. The wireless transmitter may send a series of symbols represented by phase transitions between multiple points on the constellation of FIG. 1 to the wireless receiver.

The wireless receiver processes a received signal to determine the transmitted constellation points. By determining the constellation point, the symbol, and thus the transmitted data, may be determined. Oftentimes, the received signal may not perfectly align with a constellation point; however, the symbol may still be determined by associating the received signal with the closest constellation point. Since the symbols are transmitted periodically, the wireless receiver may determine subsequent symbols by periodically examining the received signal to determine subsequent constellation points. Continuing the example of a 3 Mbs Bluetooth EDR signal, a symbol is transmitted approximately every 1 uS. Thus, the wireless receiver may determine the received constellation point approximately every 1 uS.

However, the timing relationship between the receiver and the received signal may change for a variety of reasons, such as temperature drift or oscillator inaccuracies at either the transmitter or receiver. A change in timing may result in the wireless receiver incorrectly determining the transmitted constellation point.

Therefore, what is needed in the art is a method to determine changes in timing of a received DPSK signal and compensate for the changes within the processing of the DPSK signal.

SUMMARY OF THE INVENTION

A method for adjusting the timing of a signal received by a DPSK receiver may include digitizing the received DPSK signal to produce a digital signal and down-sampling that digital signal by selecting a first set of sub-samples to produce a baseband signal. If a timing error is detected in the baseband signal, then the baseband signal may be retimed. In one embodiment, the baseband signal may be retimed by selecting a second set of sub-samples for down-sampling the digital signal.

The timing error may be determined by examining the differences between selected sub-samples (i.e., sub-samples selected as DPSK constellation points) and adjacent sub-samples before and after the selected sub-sample. In one embodiment, the differences may be averaged to reduce frequent timing changes due to perturbations such as, but not limited to, noise or filter performance. In another embodiment, the differences may be averaged by leaky-bucket IIR filters.

Timing changes in the baseband signal may cause changes to a determined phase signal. To compensate, a phase offset may applied to the phase signal in response to a detected timing error.

DETAILED DESCRIPTION

Figure 1:
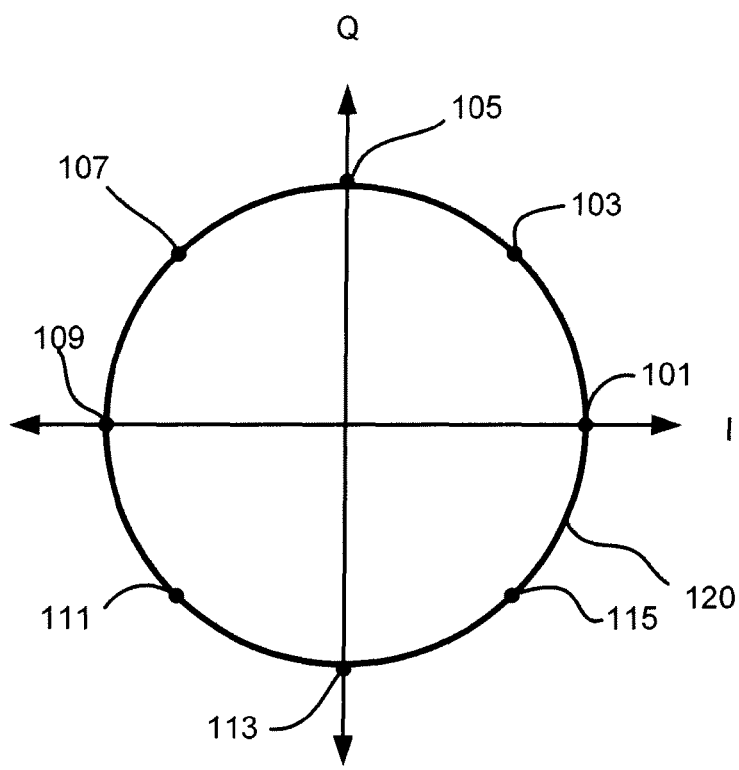
FIG. 1 is a diagram of eight constellation points for an 8 DPSK system.
Figure 2:
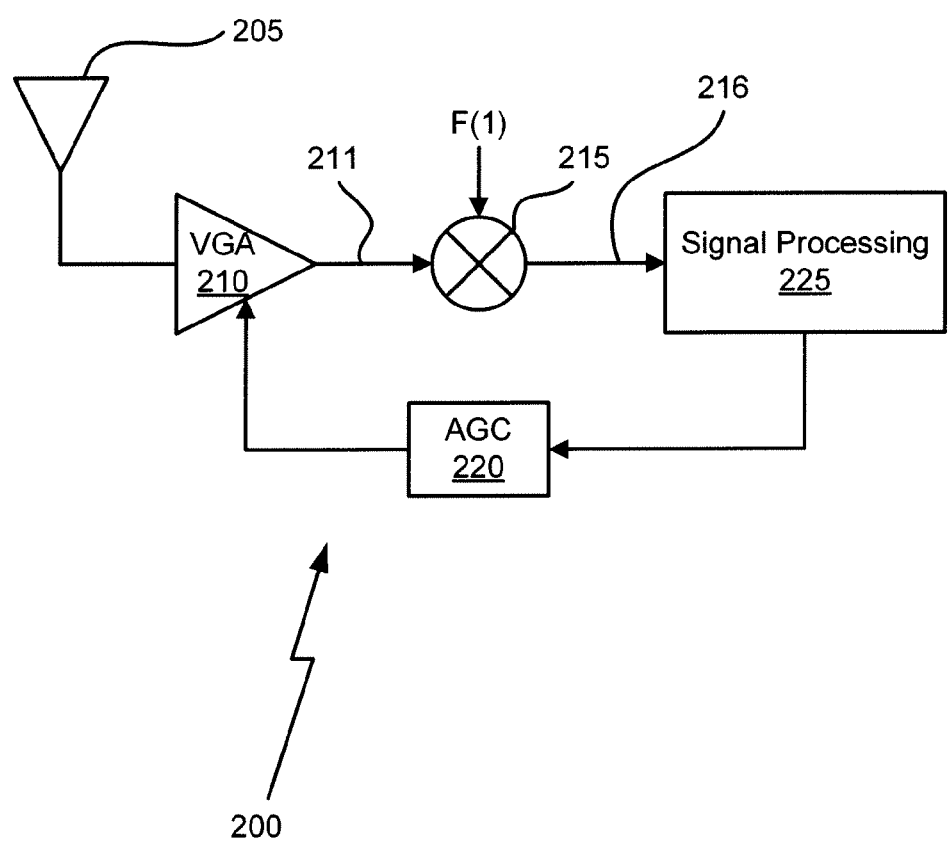
FIG. 2 is a block diagram of a DPSK receiver.

Differential phase-shift keying is a modulation scheme that lends itself to polar processing because the constellation points are distributed radially on a circle about the origin in the I-Q plane. FIG. 2 is a block diagram of a DPSK receiver 200.

The DPSK receiver 200 may include an antenna 205, a variable gain amplifier (VGA) 210, a mixer 215, an automatic gain controller (AGC) 220, and a signal processing block 225. The antenna 205 is coupled to the VGA 210. The antenna may receive DPSK signals and may provide those signals to the VGA 210. The VGA 210 may provide gain to received DPSK signals. The output of the VGA 210 (i.e., amplified DPSK signals 211) is coupled to the mixer 215. The mixer 215 may mix the amplified DPSK signals 211 with a frequency F1 to produce an intermediate frequency (IF) signal 216. In one embodiment, the DPSK receiver 200 may be configured to receive Bluetooth signals and the frequency F1 may be approximately 2.395 GHz.

The IF signal 216 is provided to the signal processing block 225. The signal processing block 225 may process the IF signal 216 to determine which DPSK constellation points were transmitted. The signal processing block 225 is coupled to the AGC 220 and the output of the AGC 220 is coupled to the VGA 210. In one embodiment, the signal processing block 225 may provide data to the AGC 220, which enables the AGC 220 to determine a gain setting for the VGA 210.

In an alternative embodiment, the DPSK receiver 200 may be a direct conversion type of receiver. In contrast, direction conversion receivers typically do not generate an IF signal 216. Instead, the output of the VGA 210 is typically processed to provide a baseband signal directly. In that case, there is no IF signal, but rather the output of the mixer 215 may be a baseband signal.

Figure 3:
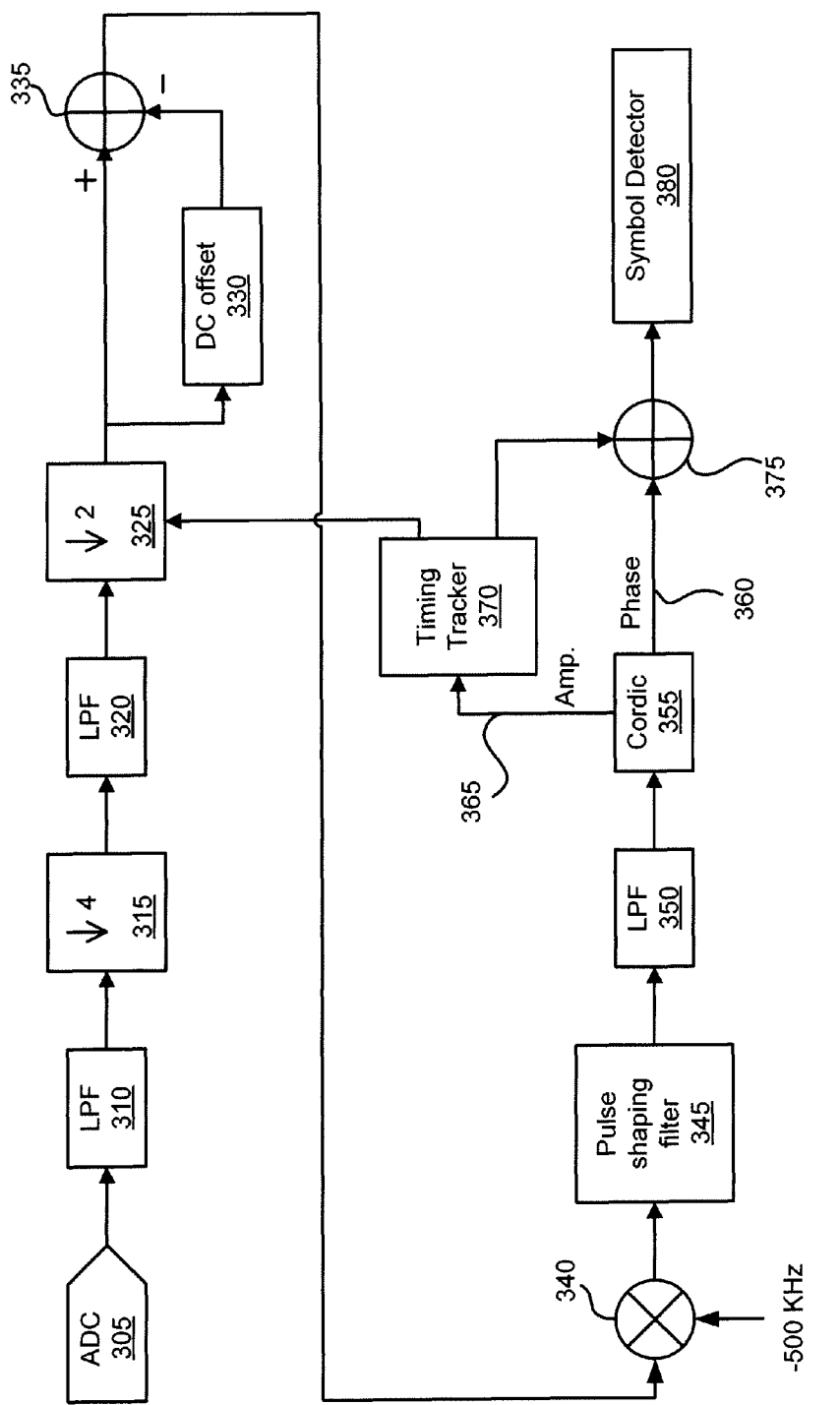
FIG. 3 is a block diagram showing details of the signal processing block of FIG. 2; and, FIG. 4 is an exemplary diagram showing a received baseband signal plotted through DPSK constellation points.

FIG. 3 is a block diagram showing details of the signal processing block 225. The signal processing block 225 processes the IF signal provided by the mixer 215 of FIG. 2. The IF signal is converted from analog to digital and processed to recover the transmitted DPSK constellation points.

The signal processing block 225 may include an analog-to-digital converter (ADC) 305, a first low-pass filter 310, a first down-sampler 315, a second low-pass filter 320, a second down-sampler 325, a DC offset estimator 330, a first adder 335, a digital mixer 340, a pulse shaping filter 345, a third low-pass filter 350, a cordic processor 355, a timing tracker 370, a phase adjuster 375 and a symbol detector 380.

The ADC 305 receives the IF signal from the mixer 215. The ADC 305 converts the IF signal from analog to digital. In one embodiment, the ADC 305 may be implemented with two ADCs operating in quadrature such that two signal paths may be created. For example, a first ADC may produce a direct I signal and a second ADC may produce a quadrature Q signal. Note that although the I and Q signals may be processed in parallel, FIG. 3 shows a single signal path for simplicity.

In one embodiment, the ADC 305 may comprise 2-1 sigma delta ADCs, with two bits for each I and Q signal. These two bit signals may receive further processing to form four bits for each I and Q signal with a sampling rate of 64 MHz to produce a digital IF signal. The ADC 305 is coupled to the first low-pass filter 310. The first low-pass filter 310 limits energy of the digital IF signal to a desired frequency range and removes some quantization noise. In one embodiment, the frequency response of the first low-pass filter 310 may be described by (eq. 1).

$$H_{MA}(\omega) = \left[ e^{-j\frac{3}{2}\omega} \frac{\sin(2\omega)}{\sin(\omega)} \right]^4 \quad (eq. 1)$$

The output of the first low-pass filter 310 is coupled to the first down-sampler 315. The first down-sampler 315 decimates by four and, thus, in one embodiment, the resulting sampling rate is 16 MHz. The output of the first down-sampler 315 may be quantized to 9 bits/sample and is coupled to the second low-pass filter 320.

The second low-pass filter 320 receives data from the first down-sampler 315. The second low-pass filter 320 removes more quantization noise. In one embodiment, the impulse response of the second low-pass filter 320 may be that of an ideal low-pass filter with a cut-off frequency of $\pi/2$ multiplied by a Hamming window. The output of the second low-pass filter 320 is coupled to the second down-sampler 325.

The second low-pass filter 320 provides data to the second down-sampler 325, which decimates by two, thus, the sampling rate becomes 8 MHz. In one embodiment, the second down-sampler 325 may select (and pass) even data samples. In another embodiment, the second down-sampler 325 may select (and pass) odd data samples. In yet another embodiment, the initial selection of the data samples may be arbitrary (i.e., initially, the even or odd data samples may be selected). The output of the second down-sampler 325 may be quantized to 13 bits/sample and is coupled to the adder 335 and the DC offset estimator 330.

The DC offset block 330 examines the data from the second down-sampler 320 and estimates an included 0 Hz (DC) component. The estimated DC component is subtracted from the data provided by the second down-sampler 330 by the adder 335. The output of the adder 335 is coupled to the digital mixer 340. The digital mixer 340 produces a baseband signal by rotating the IF signal by approximately 500 KHz. The output of the digital mixer 340 is coupled to the pulse shaping filter 345.

The pulse shaping filter 345 shapes the pulse to reduce inter-symbol interference. In one embodiment, the pulse shaping filter 345 may be a root-raised cosine filter. If a DPSK transmitter includes a root-raised cosine filter in the transmit signal path, the result of a signal going through the root-raised cosine filter twice (once on the transmit side and once on the receive side) is that the signal has effectively gone through one raised cosine filter, which may introduce zero inter-symbol interference. The output of the pulse shaping filter 345 is coupled to the third low-pass filter 350. In one embodiment, the third low-pass filter 350 may provide more attenuation at a 2 MHz offset. The output of the third low-pass filter 350 is coupled to the cordic processor 355.

The cordic (COordinate Rotation DIgital Computer) processor 355 transforms the output of the third low-pass filter 350 into polar coordinates (i.e., phase and amplitude). As described earlier, the signal path from the ADC 305 may include I and Q signals. In one embodiment, the cordic processor 355 accepts the rectangular I and Q signals and produces a phase signal 360 and an amplitude signal 365. The amplitude signal 365 is coupled to the timing tracker 370 and the phase signal 360 is coupled to the phase adjuster 375. In one embodiment, the phase adjuster 375 may be implemented with an adder. The output of the phase adjuster 375 is coupled to the symbol detector 380. The symbol detector 380 may determine the transmitted DPSK data by, among other things, examining the differential phase between transmitted constellation points.

The timing tracker 370 examines the amplitude signal 360. More particularly, the timing tracker 370 examines differences between amplitudes of currently selected and adjacent sub-samples. In response to the differences, the timing tracker 370 may configure the second down-sampler 325 to change the timing of the data provided to the cordic processor 355. Additionally, the timing tracker 370 may also modify the phase signal (described in more detail in conjunction with FIG. 4).

Figure 4:
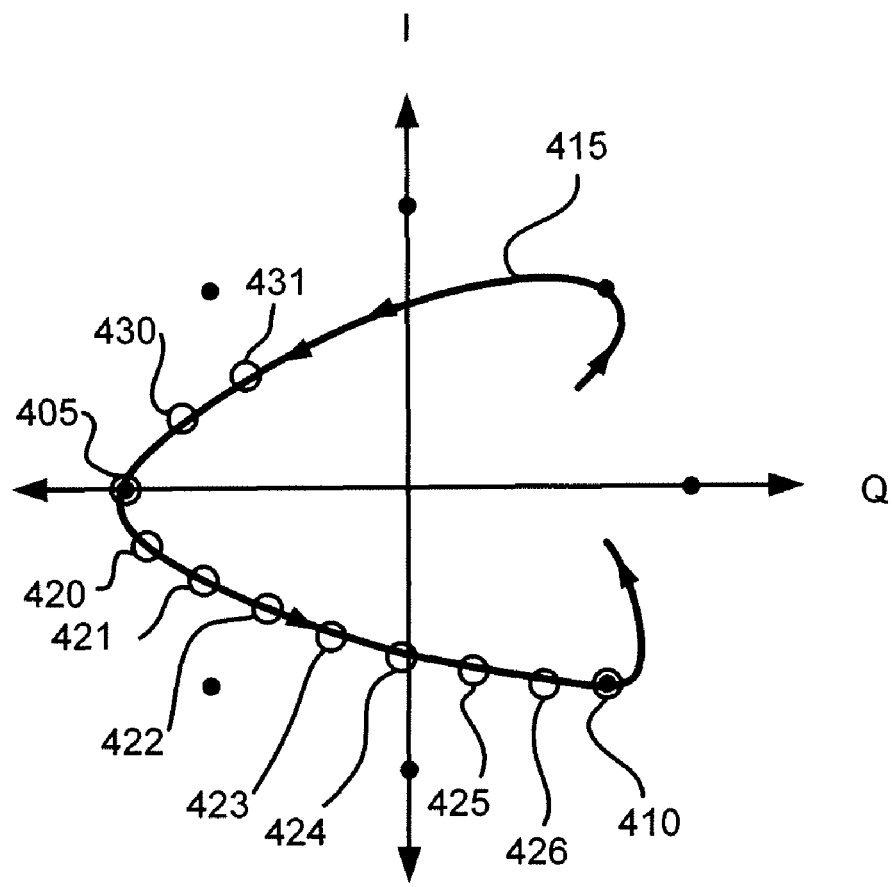

FIG. 4 is an exemplary diagram showing a received baseband signal plotted through DPSK constellation points 400. In this example, only a portion of the received baseband signal is shown for clarity. As shown, there is a first sub-sample 405 associated with a first DPSK constellation point and a second sub-sample 410 associated with a second DPSK constellation point. In this example, sub-samples 405 and 410 are coincident with constellation points. The path 415 shows the trajectory of an exemplary received 1 MHz bandwidth DPSK signal. In this example, the first and second sub-samples (405 and 410 respectively) are temporally separated by 1 uS. As described above, the baseband signal provided to the cordic processor 355 is sampled at 8 MHz (i.e., the baseband signal is eight times oversampled). Thus, additional sub-samples may lie on the path 415 between sub-sample points 405 and 410. These sub-samples may be temporally separated by 125 nS. Typical sub-sample points 420-426 are shown on path 415 between sub-samples 405 and 410. More sub-samples may exist elsewhere on the path 415, but are omitted for clarity.

The timing tracker 370 determines if a timing adjustment should be made by examining the amplitude of sub-sample points adjacent to currently selected sub-samples. The currently selected sub-sample is the sub-sample chosen as the sample associated with a DPSK constellation point. In this example, sub-samples 405 and 410 are currently selected sub-samples. As described earlier, selected sub-samples should lie relatively close to predefined constellation points, which lie on a circle about the origin. In other words, the amplitude signal 365 from the cordic processor 355 should be a relative maximum value for a selected sub-sample associated with a DPSK symbol. However, there may be some instances when either a sub-sample before or after the selected sub-sample may have a relatively greater amplitude than the selected sub-sample due to influences such as filtering constraints or noise. These instances are generally temporary, thus, on the average, the selected sub-sample should have a relatively greater amplitude value than sub-samples before and after the selected sub-sample. These temporary excursions may be addressed by low-pass filtering as is described in detail below.

In one embodiment, the timing tracker 370 may monitor the differences of the amplitudes related to the above mentioned sub-samples. The differences may be averaged through a low-pass filter, such as a well-known leaky-bucket infinite impulse response (IIR) filter.

To illustrate an example when the baseband signal may not need retiming, consider currently selected sub-sample 405, the sub-sample before 430, and the sub-sample after 420 shown in FIG. 4. The sub-sample 405 appears to have relatively larger amplitude compared to sub-samples 420 and 430. Let the amplitude of the currently selected sub-sample 405 be Amp1, the amplitude of the sub-sample before 430 be Amp2, and the amplitude of the sub-sample after 420 be Amp3. In this example, a first difference between the amplitude of the currently selected sub-sample 405 minus the amplitude of the sub-sample before 430 is positive. Expressed as eq. 2, $$\text{Diff1}=\text{Amp1}-\text{Amp2}>0. \tag{eq. 2}$$

A second difference between the amplitude of the currently selected sub-sample 405 (Amp1) and the amplitude of the sub-sample after 420 (Amp3) is also positive.

$$\text{Diff2}=\text{Amp1}-\text{Amp3}>0 \tag{eq. 3}$$

Since the first and the second differences are both positive, a timing correction of the baseband signal may not be needed.

To illustrate an example of when the baseband signal may need to be delayed, consider currently selected sub-sample 430, the sub-sample before 431, and the sub-sample after 405. Let the amplitude of the currently selected sub-sample 430 be Amp1, the amplitude of the sub-sample before 431 be Amp2, and the amplitude of the sub-sample after 405 be Amp3. In this example, the first difference between the currently selected sub-sample 430 and the sub-sample before 431 is positive.

$$\text{Diff1}=\text{Amp1}-\text{Amp2}>0 \tag{eq. 4}$$

The second difference between the amplitude of the currently selected sub-sample 430 (Amp1)) and the amplitude of the sub-sample after 405 (Amp3) is negative.

$$\text{Diff2}=\text{Amp1}-\text{Amp3}<0 \tag{eq. 5}$$

Since the first difference is positive and the second difference is negative, the timing of the baseband signal may need to be advanced.

To illustrate an example of when the baseband signal may need to be retarded, consider currently selected sub-sample 420, the sub-sample before 405 and the sub-sample after 421. Again, let the amplitude of the currently selected sub-sample 420 be Amp1, the amplitude of the sub-sample before 405 be Amp2, and the amplitude of the sub-sample after 421 be Amp3. In this example, the first difference between the currently selected sub-sample 420 and the sub-sample before 405 is negative.

$$\text{Diff1}=\text{Amp1}-\text{Amp2}<0 \tag{eq. 6}$$

The second difference between the amplitude of the currently selected sub-sample 420 (Amp1) and the amplitude of the sub-sample after 421 (Amp3) is positive.

$$\text{Diff2}=\text{Amp1}-\text{Amp3}>0 \tag{eq.7}$$

Since the first difference is negative and the second difference is positive, the timing of the baseband signal may need to be retarded.

As described above, there may be some instances when a currently selected sub-sample may not have the relatively largest amplitude. For example, filter response or noise may cause a sub-sample before or after the currently selected sub-sample to have a relatively larger amplitude. To help prevent retiming the baseband signal in response to such instances, the differences (Diff1 and Diff2) may be averaged. In one embodiment, the differences may be averaged through a low-pass filter, such as a well-known leaky-bucket infinite impulse response (IIR) filter.

Table 1 below summarizes the baseband retiming response with respect to the differences.

TABLE 1

| Diff1 | Diff2 | Baseband timing |
|---|---|---|
| Diff1 > 0 | Diff2 > 0 | No change |
| Diff1 > 0 | Diff2 < 0 | Advance baseband signal |
| Diff1 < 0 | Diff2 > 0 | Retard baseband signal |

To prevent repeated timing changes that may arise because of noise, current temporal alignment or other reasons, hysteresis may be used. In one embodiment, a wait period may be used to avoid transients in the output of the leaky-bucket filter. Typically, the wait period may be determined by, in part, the step response of the leaky-bucket filter. The same wait period may be enforced to after a valid timing change to the baseband signal to allow filters, such as the leaky-bucket filter to settle.

Two changes in aspects of the baseband signal processing may occur to enable a change in baseband signal timing. First of all, although the comparison done by the timing tracker 370 is with adjacent sub-samples, the timing adjustment may be more finely grained since the signal processing block 225 includes the second down-sampler 325. By causing the second down-sampler 325 to select the currently non-selected sub-samples, the baseband signal temporally shifts by one-half a sample period (i.e., in this exemplary case approximately 62.5 nS). For example, if the second down-sampler 325 is presently configured to select even sub-samples, the configuration of the second down-sampler 325 may be changed to select odd sub-samples.

Secondly, a change in sub-sample selection may affect the phase of the sub-sample due to the effect of the digital mixer 340. By switching from one down-sampling phase to another, a corresponding phase change in the digital mixer 340 should also be applied. In order to compensate, a phase adjustment may be applied to the output of the cordic processor 355 rather than at the digital mixer 340 itself. If the timing tracker 370 seeks to retard the timing of the baseband signal timing (i.e., the average of the first difference (Diff1) is greater than zero, while the average is the second difference (Diff2) is less than zero), then a fixed phase offset may be added to the phase. Continuing our example, the sample rate prior to the second down-sampler 325 is 16 MHz. Selecting the non-selected samples (i.e. switching from odd to even samples) causes a phase offset of $\pi/16$. Therefore, when changing the sub-samples selected by the second down-sampler 325, the phase output by the cordic processor 355 may be adjusted by adding a phase offset (eq. 8). Notably, the phase offset is a function of not only the sampling rate, but also the frequency used by the digital mixer 340 (as shown by the 500 KHz term in eq. 8).

$$\text{phase offset} = \pi/16 = \angle\left\{e^{+j(500KHz)(2\pi)\left(\frac{1}{16MHz}\right)}\right\} \quad \text{(eq. 8)}$$

If, on the other hand, the timing tracker 370 seeks to advance the baseband signal timing (i.e., the average of the first difference (Diff1) is less than zero, while the average is the second difference (Diff2) is greater than zero), then a fixed phase offset may be subtracted from the phase.

Referring back to FIG. 3, the timing tracker 370 is coupled to the second down-sampler 325 and the phase adjuster 375. The timing tracker 370 may signal the second down-sampler 325 to select even or odd sub-samples in accordance with the specification. The time tracker 370 may also signal the phase adjuster 375 to add or subtract a phase offset as described above in eq. 8.

The signal processing block 225 may advantageously monitor timing changes within a baseband signal. The signal processing block 225 may also advantageously adjust the timing of the baseband signal in timing steps one-half the size of the sub-sampling period of the symbol detector 380.

In one embodiment, the timing tracker 370 may calculate the amplitude differences between sub-samples and modify the baseband signal timing only when an average of sub-sample differences exceeds a threshold. In an alternative embodiment, the sub-sample differences may be low-pass filtered. This filtering advantageously reduces the rate of timing change that the timing tracker 370 may provide, thus effectively low-pass filtering the rate of timing changes.

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. A method for adjusting timing of a DPSK signal, the method comprising:
    digitizing a DPSK signal to produce a digital DPSK signal having a first set of sub-samples and a second set of sub-samples, the first set of sub-samples and the second set of sub-samples being even and odd samples, respectively, or vice versa;
    down-sampling the digital DPSK signal by using the first set of sub-samples to produce an intermediate signal;
    determining whether the intermediate signal includes a timing error;
    using a signal processing block, retiming the intermediate signal in response to the timing error by down-sampling the digital DPSK signal using the second set of sub-samples;
    producing phase and amplitude signals from the intermediate signal; and
    determining the timing error by comparing differences in amplitudes between currently selected and adjacent sub-samples of the amplitude signal.

2. The method of claim 1, wherein the differences in amplitudes between the currently selected and the adjacent sub-samples are filtered.

3. The method of claim 2, wherein the filter is a leaky-bucket filter.

4. The method of claim 2, wherein the filter is an averaging filter.

5. The method of claim 1, wherein an amount of timing adjustment is determined by a temporal difference between the first and second sets of sub-samples.

6. The method of claim 1, further comprising:
    adjusting the phase signal by a phase offset when retiming the intermediate signal.

7. The method of claim 6, wherein the phase offset is based at least on a temporal difference between the first and second sets of sub-samples.

8. The method of claim 6, wherein the phase offset is added to the phase signal when timing of the intermediate signal is retarded and subtracted from the phase signal when the timing of the intermediate signal is advanced.

9. The method of claim 1, wherein the intermediate signal is a baseband signal, and further comprising:
    adding a phase offset to the phase signal in response to retiming the intermediate signal, wherein the phase offset is based on a temporal difference between the first and second sets of sub-samples and a first frequency.

10. A method for retiming a baseband signal, the method comprising:
    digitizing a received signal to produce first and second sets of sub-samples, the first set of sub-samples and the second set of sub-samples being even and odd samples, respectively, or vice versa;
    selecting the first set of sub-samples;
    producing a baseband signal from the first set of sub-samples;
    determining whether the baseband signal has a timing error;
    using a signal processing block, retiming the baseband signal by selecting the second set of sub-samples when a timing error is present; and
    modifying a phase of the baseband signal in response to selecting the second set of sub-samples.

11. A DPSK signal processor, comprising:
    an analog-to-digital converter configured to digitize a DPSK signal producing first and second sets of sub-samples, the first and the second sets of sub-samples being even and odd samples, respectively, or vice versa;
    a down-sampler configured to select the first set of sub-samples to produce a digital signal;
    a cordic processor configured to produce phase and amplitude signals from the digital signal; and,
    a timing tracker configured to determine timing errors of the digital signal and retime the digital signal in response to a timing error,
    wherein the timing tracker configures the down-sampler to select the second set of sub-samples in response to the timing error.

12. The DPSK signal processor of claim 11, wherein the timing tracker determines timing errors by comparing differences in amplitudes between currently selected and adjacent sub-samples of the digital signal.

13. The DPSK signal processor of claim 12, wherein the differences are low-pass filtered.

14. The DPSK signal processor of claim 12, wherein the differences are filtered by a leaky-bucket filter.

15. The DPSK signal processor of claim 12, further comprising a phase adjuster configured to adjust the phase signal in response to the determined timing error.

16. The DPSK signal processor of claim 15, wherein the phase adjuster adds a phase offset to the phase signal when the timing of the intermediate signal is retarded and subtracts the phase offset from the phase signal when the timing of the intermediate signal is advanced.

17. The DPSK signal processor of claim 16, wherein the phase offset is related to a temporal difference between the first and second sets of sub-samples selected by the down-sampler.

18. The DPSK signal processor of claim 16, wherein the $$\text{phase offset} = \pi/16 = \angle\left\{e^{+j(500KHz)(2\pi)\left(\frac{1}{16MHz}\right)}\right\}.$$

* * * * *